(No Model.)
S. D. STROHM.
METALLIC CIRCUIT FOR ELECTRICAL CURRENTS.
No. 267,279. Patented Nov. 7, 1882.
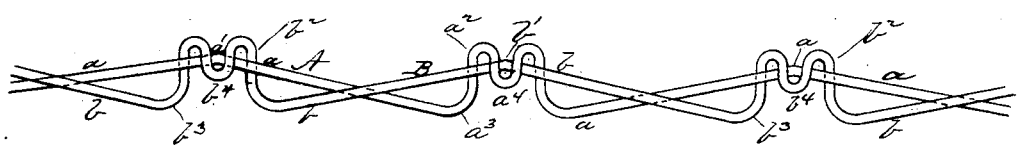
WITNESSES:
Wm H. Powell.
Jos. B. Connolly
INVENTOR
Samuel D. Strohm,
By Connolly Bros,
ATTORNEYS

UNITED STATES PATENT OFFICE.

SAMUEL D. STROHM, OF PHILADELPHIA, PA., ASSIGNOR, BY MESNE ASSIGN-MENTS, OF ONE-THIRD TO EDWARD C. SNYDER, OF SAME PLACE.

METALLIC CIRCUIT FOR ELECTRICAL CURRENTS.

SPECIFICATION forming part of Letters Patent No. 267,279, dated November 7, 1882.

Application filed April 6, 1882. (No model.)

*To all whom it may concern:*

Be it known that I, SAMUEL D. STROHM, a citizen of the United States, residing at Philadelphia, in the county of Philadelphia and State of Pennsylvania, have invented certain new and useful Improvements in Metallic Circuits for Electrical Currents; and I do hereby declare the following to be a full, clear, and exact description of the invention, reference being had to the accompanying drawing, which forms part of this specification, in which—

The figure is a plan showing metallic circuit composed of wires constructed and combined according to my invention.

My invention has relation to metallic circuits for electrical currents, and has for its object to make the direct and return wires of uniform resistance, to cause said wires to cross and recross in a zigzag manner, so as to avoid parallelism, yet remain practically equidistant from any adjacent conductor running in the same direction, and to maintain such wires in a fixed relative position.

My invention consists in the peculiar construction and combination of wires forming a metallic circuit, as hereinafter fully described and claimed.

Referring to the accompanying drawing, A B represent two wires adapted and designed to form a complete metallic circuit for electrical currents, for the purpose of neutralizing induced currents produced by or from working-currents in adjacent conductors.

The wires A B are exactly similar in length, diameter, and material, and therefore are of like resistance. They are also similar in construction, each wire being bent to form zigzags, the inclines of which are indicated by the letters $a$ and $b$, respectively. These inclines form angles $a'$ and $b'$, as shown, and between alternate inclines fastening-loops $a^2 b^2$ are also formed. These loops are made by bending the wires so as to produce curves $a^3 b^3$, and then bending the tops of these curves over again, forming secondary short reversed curves $a^4 b^4$. The wires A and B are fitted together by bringing the angles of one wire into the fastening-loops of the other, as shown. By this construction it will be noted that a metallic circuit is produced in which the direct or outgoing wires and return-wires are exactly equal in resistance; that they cross and recross one another constantly, so as to avoid inducing upon each other and at the same time be substantially equidistant in the aggregate for their whole length from any adjacent conductor running in the same direction; and, finally, that they are so fastened that they will maintain their relative arrangement after being once fixed therein. The conductors, of course, are metallic, and duly insulated from each other by wrapping or coating.

I am aware that it is not new broadly to construct a metallic circuit of two wires interlocking or intertwining with one another for the purpose of avoiding induction. Hence I do not broadly claim such construction.

What I claim as my invention is—

1. A metallic circuit for electric currents, composed of the wires A B, bent to form zigzags or inclines $a b$, with angles $a' b'$, and having fastening-loops $a^2 b^2$ between alternate inclines, substantially as shown and described.

2. A metallic circuit for electric purposes, composed of zigzag wires A B, constructed with inclines, angles, and fastening-loops, said wires being combined, as described, whereby their inclines cross and recross, the angles of each resting in the fastening-loops of the other, substantially as shown and described.

In testimony that I claim the foregoing I have hereunto set my hand this 5th day of April, 1882.

SAMUEL D. STROHM.

Witnesses:
ANDREW ZANE, Jr.,
M. D. CONNOLLY.